United States Patent Office 3,070,627
Patented Dec. 25, 1962

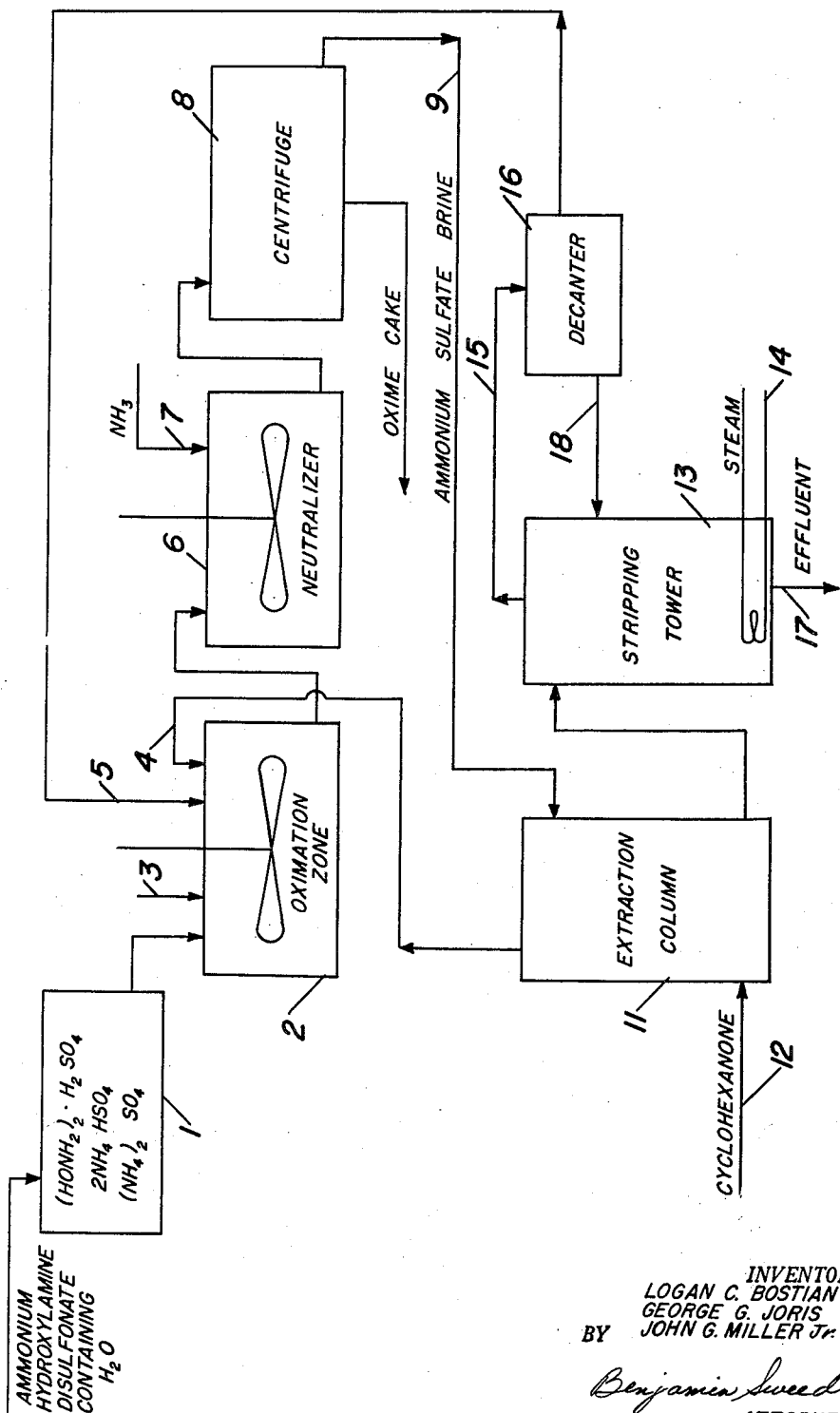

3,070,627
SYNTHESIS OF CYCLOHEXANONE OXIME
Logan C. Bostian, Morristown, George G. Joris, Madison, and John G. Miller, Jr., Denville, N.J., assignors to Allied Chemical Corporation, New York, N.Y., a corporation of New York
Filed Feb. 25, 1959, Ser. No. 795,485
4 Claims. (Cl. 260—566)

This invention relates to the synthesis of cyclohexanone oxime by reacting cyclohexanone with hydroxylamine. Cyclohexanone oxime, as is well known, is an intermediate useful in the production of caprolactam by the Beckman rearrangement. One of the more important uses of caprolactam is in the production of nylon type fibers and resins.

The synthesis of cyclohexanone oxime by reacting cyclohexanone with an excess of hydroxylamine over the theoretical amount for formation of cyclohexanone oxime has been suggested. The excess of hydroxylamine assures complete utilization of the cyclohexanone which otherwise tends to contaminate the oxime product. Hydroxylamine sulfate solution produced by the partial hydrolysis of hydroxylamine disulfonate has been suggested as the source of hydroxylamine employed in such synthesis.

In copending application of Logan C. Bostian and George G. Joris, Serial No. 767,447, filed October 15, 1958, is disclosed a process for recovering hydroxylamine values from aqueous ammonium sulfate brine by extracting the brine at a pH of about 2.5 or higher with cyclohexanone in a mol ratio of at least about 5 to 1, preferably between 7 to 1 and about 10 to 1, at a temperature of from 40° C. to 70° C. and recovering an organic distillate consisting essentially of cyclohexanone from the brine raffinate by steam distilling off at least about 1%, but not more than about 4%, by weight of the raffinate. By hydroxylamine values is meant hydroxylamine sulfonate or other forms of hydrolyzable hydroxylamine derivatives present in the aqueous ammonium sulfate brine.

The oximation, as heretofore carried out, including the use of hydroxylamine sulfate liquor produced by boiling the disulfonate for about one-half hour as the source of the hydroxylamine, invariably results in some lactam formation during the oximation and also in the formation of tars which contaminate the oxime product. While the reason for tar formation is not fully known, it is believed in part at least to be due to reaction between lactam and hydroxylamine monosulfonate extracted from the ammonium sulfate brine and recycled through the oximation reaction zone. Thus the process as heretofore proposed not only results in a loss of reactants due to the formation of lactam, but also results in an oxime product contaminated with undesirable tars.

It is among the objects of the present invention to provide a process of synthesizing cyclohexanone oxime in which during the oximation of the cyclohexanone, the formation of lactam is minimized and in which, notwithstanding the recycling through the oximation reaction zone of the cyclohexanone extractant employed to recover hydroxylamine values including the cyclohexanone oxime content of the aqueous ammonium sulfate brine, the formation of tars which tend to contaminate the oxime product is also minimized, if not completely prevented.

In accordance with this invention, hydroxylamine disulfonate produced as is well known by the reaction of ammonium nitrite, sulfur dioxide and ammonia is hydrolyzed to convert at least 97% of the ammonium hydroxylamine monosulfonate produced when the disulfonate is completely hydrolyzed to a hydroxylamine reactant containing hydroxylamine sulfate, and/or hydroxylamine acid sulfate, ammonium sulfate and/or ammonium bisulfate. Preferably the hydroxylamine disulfonate is hydrolyzed to convert 100% of the ammonium hydroxylamine monosulfonate to sulfonate-free hydroxylamine reactant containing hydroxylamine sulfate and/or hydroxylamine acid sulfate, ammonium sulfate and/or ammonium bisulfate. The resultant hydroxylamine reactant is introduced into the oximation zone; into this zone is also fed (a) the cyclohexanone extract from the extraction of the ammonium sulfate brine, which cyclohexanone extract contains hydroxylamine values removed from the brine, (b) the organic distillate consisting essentially of cyclohexanone removed from the brine raffinate, and (c) additional cyclohexanone if needed, to thus provide in the oximator a reaction mixture containing at least 5, preferably from about 5 to 15, mol percent of hydroxylamine over and above the theoretical amount required for reaction with the cyclohexanone. Ammonia is introduced into the reaction mixture while agitating to produce at the completion of the oximation a reaction mixture having a pH of from 3 to 3.5, preferably 3.2 to precipitate the cyclohexanone oxime. The precipitate is separated from the ammonium sulfate mother liquor or brine by a centrifugal separator or by filtration.

The temperature at which the oximation is effected is not critical, provided it is maintained below 60° C. The preferred temperature is 40° C. to 50° C., determined by the cooling economically obtainable with water at atmospheric temperature.

Hydrolyzing at atmospheric pressure the ammonium hydroxylamine disulfonate solution, which as produced already contains enough water to effect complete hydrolysis, is heated at 105° C. for from 5 to 7 hours. Under superatmospheric pressure conditions, say about 15 pounds gauge, the temperature may be as high as 120° C. to 125° C. with a reduction in time say to about 75 minutes. By observing these conditions, at least 97% hydrolysis is obtained, the pH of the hydrolyzed hydroxylamine is from 0.5 to 1.0.

It is also important that the hydroxylamine reactant produced by hydrolysis of at least 97% of the hydroxylamine monosulfonate is not neutralized before admixture with the cyclohexanone. Preneutralization of the hydrolyzed hydroxylamine solution results in objectionable quantities of unreacted cyclohexanone remaining at the end of the oximation, which cyclohexanone contaminates the oxime product.

The hydrolysis, as is well known, is an exothermic reaction. The hot hydroxylamine reactant, containing hydroxylamine sulfate, hydroxylamine acid sulfate, ammonium sulfate and ammonium bisulfate, desirably is passed in indirect heat exchange relation with the ammonium hydroxylamine disulfonate to the hydrolyzer zone to heat the latter and simultaneously cool the hydrolyzed hydroxylamine reactant. The thus cooled hydroxylamine reactant is introduced into the oximation zone.

Into this oximation zone is also introduced cyclohexanone, if needed, cyclohexanone extract from the extraction of the aqueous ammonium sulfate brine, and cyclohexanone distillate obtained by distilling up to about 4% of the ammonium sulfate raffinate. The amount of cyclohexanone thus introduced into the oximation zone is such as to provide an excess of at least 5 preferably from about 5 to 15 mol percent hydroxylamine over that theoretically required for reaction with all of the cyclohexanone. Using less than a 5 mol percent excess of hydroxylamine, the oxime is contaminated with unreacted cyclohexanone.

The hydroxylamine reactant and the cyclohexanone are mixed desirably at a temperature below 100° C., preferably 50° C. to 60° C., and at atmospheric pressure, agitated and cooled. The cooled reaction mixture is neutralized with ammonia while continuing the agitation and cooled to a temperature of 40° C. to 50° C. The ammonia is added until the reaction mixture has a pH of 3 to 3.5, preferably 3.2; cyclohexanone oxime precipitates, producing a slurry of the precipitated oxime in aqueous ammonium sulfate brine.

This slurry is introduced into a separator, such as a centrifuge, where the oxime product is separated from the aqueous ammonium sulfate brine. If the pH of the brine is below 2.5, ammonia is added until its pH is 2.5 or higher. The pH of the brine may be within the range of from 2.5 to 4.0, when it is subjected to extraction with the cyclohexanone employing at least 5 mols of cyclohexanone per mol of hydroxylamine values contained in the brine, preferably a mol ratio of between about 7 to 1 and 10 to 1. This extraction is carried out at a temperature of from room temperature to about 70° C., preferably about 40° C. to 70° C. If carried out at about 70° C., the cyclohexanone extract is cooled to about 50° C. before introduction into the oximation zone.

The raffinate from the cyclohexanone extraction is subjected to steam distillation. At least the first 1% by weight, but not more than 4% by weight, is distilled off, condensed, the condensate passed to a decanter where it separates into an upper organic layer consisting chiefly of cyclohexanone and a lower aqueous layer. The cyclohexanone layer may be cooled to about 50° C., and introduced into the oximation zone. By so doing, substantially all of the cyclohexanone employed in the extraction treatment and the hydroxylamine values in the ammonium sulfate brine are recovered and introduced into the oximation zone. Alternatively, the cyclohexanone layer may be employed as feed to the extractor where hydroxylamine values are extracted from the ammonium sulfate brine.

The brine, extracted as above described and distilled to remove not more than about 4% of the raffinate, will not cause undue pollution and can be disposed of, desirably after crystallization of sulfate therefrom, as industrial waste water in streams without causing undue pollution.

The accompanying drawing is a flow sheet illustrative of the process embodying the present invention.

In this drawing, 1 indicates the hydrolysis zone in which ammonium hydroxylamine disulfonate containing water and produced by any known procedure, such as the reaction of ammonium nitrite solution with sulfur dioxide and ammonia, is heated to a temperature of at least 105° C. for a sufficiently long period to effect hydrolysis of at least 97% of the ammonium hydroxylamine monosulfonate produced in the reaction. The completely or substantially completely (at least 97%) hydrolyzed hydroxylamine reactant is cooled to about 50° C., desirably by heat exchange with the incoming disulfonate, and introduced into the oximation zone 2. Into this zone is also introduced cyclohexanone, if needed, from inlet 3, cyclohexanone extract through line 4, and that recovered from the raffinate through line 5. Preferably, all of the cyclohexanone required for the oximation is supplied by the cyclohexanone extract.

The oximation zone 2 communicates with a neutralizer into which ammonia is introduced through line 7. From the neutralizer, the slurry formed in the neutralizer flows to the centrifuge 8 where separation of the oxime cake and ammonium sulfate brine is effected. The latter flows through line 9 into the extraction column 11. Cyclohexanone enters the base of this column at 12, and the cyclohexanone extract containing hydroxylamine values flows through line 4 into the oximation zone 2. The aqueous layer from extraction column 11 flows into the top of stripping tower 13 provided with a steam heating coil 14. The distillate consisting of from 1% to 4% of the raffinate and containing substantially all of the cyclohexanone is taken off overhead through line 15, condensed and fed to decanter 16; the organic layer from this decanter is cooled and fed to the oximation zone 2 through line 5. The lower aqueous layer is returned to the stripping tower through line 18. The remaining 96% to 99% of the raffinate is discharged through the effluent line 17 leading from the base of the stripping tower.

The following examples are given for purposes of illustrating the invention. It will be understood the invention is not limited to these examples. In these examples, all parts and percentages are on a weight basis.

*Example I*

3,240 parts of solution containing 1,000 parts ammonium hydroxylamine disulfonate and 2,070 parts water are heated for 6 hours at 105° C. 97% hydrolysis takes place.

264 parts (8.0 mols) of the hydroxylamine reactant thus produced and 684 parts (6.98 mols) cyclohexanone containing 84 parts cyclohexanone oxime are mixed in the oximation zone. The cyclohexanone solution is obtained by extracting a previous batch of ammonium sulfate brine and includes 10 parts cyclohexanone obtained by condensing about 4% of the raffinate distilled off from the aforesaid previous batch. The mixture of cyclohexanone extract and hydrolyzed hydroxylamine solution is agitated for 2 hours while cooling to maintain the temperature at about 48° C. Then 237 parts of $NH_3$ are added over a period of 3 hours with cooling to maintain a temperature of about 45° C. At the completion of the ammonia addition the pH is 3.2. The slurry thus produced is introduced into a centrifugal separator where 845 parts of oxime free of tar and cyclohexanone are separated from 6,112 parts of aqueous ammonium sulfate brine.

The brine is extracted with 768 parts of cyclohexanone to produce 812 parts of cyclohexanone extract containing 679 parts of cyclohexanone and 84 parts oxime to be employed in the next oximation batch.

The raffinate from the brine extraction is distilled at atmospheric pressure taking overhead about 4% of the feed. The overhead portion is condensed and decanted. The upper organic phase, containing 10 parts cyclohexanone and 0.6 part water, is collected for use in the next oximation. The lower aqueous phase is recycled to the still as reflux.

For comparative purposes, the hydrolysis and oximation steps of the above process were substantially duplicated except that the hydrolysis was carried out to 89% completion. Upon analysis of the ammonium sulfate brine removed from the oxime cake, .023% lactam was found in this brine, whereas operating in accordance with this invention, only .003% lactam was found.

*Example II*

3,240 parts of solution containing 1,000 parts ammonium hydroxylamine disulfonate and 2,070 parts water are heated for 1.5 hours at 120° C. under pressure of 15 pounds per square inch gauge. 100% hydrolysis took place.

264 parts (8.0 mols) hydroxylamine reactant thus produced and 684 parts (6.98 mols) cyclohexanone derived as noted above in Example 1 are agitated for 2 hours, while cooling to maintain the temperature at about 50° C. The reaction mixture is then cooled to 45° C. and 237 parts of ammonia are added over a period of 3 hours while maintaining the temperature at about 45° C. At the completion of the ammonia addition, the pH of the mixture is 3.2. The slurry thus produced is introduced into a centrifuge, where 845 parts of oxime free of tar and cyclohexanone are separated from 6,110 parts of aqueous ammonium sulfate brine.

The brine is treated as described in Example I. The cyclohexanone extract of the brine as well as the distillate recovered from the raffinate are introduced in the oximator for reaction with the next batch of hydrolyzed hydroxylamine reactant.

Surprisingly the process of the invention results in a marked reduction of lactam formation during the oximation; also the present invention minimizes, if not completely eliminates, tar formation during the oximation, which tars tend to contaminate the oxime product. Thus the present invention results in a purer oxime product, with a saving in the amount of reactants and the production of an ammonium sulfate brine which can be disposed of in streams without causing undue pollution.

It will be understood that the foregoing description is given for illustrative purposes and that many variations may be made in the above described process without departing from the scope of the invention and this invention is not to be limited except as defined by the claims.

What is claimed is:

1. The process of synthesizing cyclohexanone oxime, which comprises the following steps: step 1, mixing ammonium hydroxylamine disulfonate with water and heating the resultant mixture to a temperature of at least 105° C. until at least 97% of the ammonium hydroxylamine monosulfonate produced in the hydrolysis is hydrolyzed; step 2, introducing the hydrolyzed reaction mixture, cyclohexanone and cyclohexanone extract containing hydroxylamine values recovered in step 5 of the process into an oximation zone to provide a reaction mixture containing an excess of hydroxylamine of at least 5 mol percent over the amount theoretically required for reaction with the cyclohexanone to produce cyclohexanone oxime; step 3, adding ammonia to the reaction mixture until the reaction mixture has a pH within the range of from 3 to 3.5 to produce a slurry containing precipitated cyclohexanone oxime in an ammonium sulfate brine; step 4, separating the precipitated cyclohexanone oxime from the ammonium sulfate brine; and step 5, extracting the ammonium sulfate brine with cyclohexanone employing at least 5 mols of cyclohexanone per mol of hydroxylamine present in the brine and introducing the cyclohexanone extract into step 2.

2. The process of synthesizing cyclohexanone oxime, which comprises the following steps: step 1, mixing ammonium hydroxylamine disulfonate with water and heating the resultant mixture to a temperature of at least 105° C. until at least 97% of the ammonium hydroxylamine monosulfonate produced in the hydrolysis is hydrolyzed; step 2, introducing the hydrolyzed reaction mixture, cyclohexanone, cyclohexanone extract containing hydroxylamine values recovered in step 5 of the process and cyclohexanone recovered by the distillation of the brine raffinate in step 6 of the process into the oximation zone to provide a reaction mixture containing an excess of hydroxylamine of from 5 to 15 mol percent over the amount theoretically required for the reaction with the cyclohexanone to produce cyclohexanone oxime; step 3, adding ammonia to the reaction mixture until the reaction mixture has a pH within the range of from 3 to 3.5 to produce a slurry containing precipitated cyclohexanone oxime in an ammonium sulfate brine; step 4, separating the precipitated cyclohexanone oxime from the ammonium sulfate brine; step 5, extracting the ammonium sulfate brine with cyclohexanone employing at least 5 mols of cyclohexanone per mol of hydroxylamine present in the brine and introducing the cyclohexanone extract into step 2; and step 6, distilling the raffinate from step 5 to distill off from 1% to 4% by weight of the raffinate, collecting the distillate, separating the distillate into a cyclohexanone-containing fraction and an aqueous fraction and introducing the cyclohexanone-containing fraction into step 2 of the process.

3. The process as defined in claim 1, in which the hydroxylamine disulfonate is heated until approximately 100% of the ammonium hydroxylamine monosulfonate is hydrolyzed; in step 3, ammonia is added until the reaction mixture has a pH of about 3.2; and in step 5, the ammonium sulfate brine is extracted with cyclohexanone employing a mol ratio of cyclohexanone to hydroxylamine values in the range of about 7 to 1 to about 10 to 1.

4. The process of synthesizing cyclohexanone oxime, which comprises the following steps: step 1, mixing ammonium hydroxylamine disulfonate with water and heating the resultant mixture at a temperature of at least 105° C. to produce a hydrolyzed reaction mixture having a pH between 0.5 to 1.0 in which at least 97% of the ammonium hydroxylamine monosulfonate produced in the hydrolysis is hydrolyzed; step 2, introducing the hydrolyzed reaction mixture, cyclohexanone and cyclohexanone extract containing hydroxylamine values recovered in step 5 of the process into an oximation zone to provide a reaction mixture containing an excess of hydroxylamine of at least 5 mol percent over the amount theoretically required for reaction with the cyclohexanone to produce cyclohexanone oxime; step 3, adding ammonia to the reaction mixture until the reaction mixture has a pH within the range of from 3 to 3.5 to produce a slurry containing precipitated cyclohexanone oxime in an ammonium sulfate brine; step 4, separating the precipitated cyclohexanone oxime from the ammonium sulfate brine; and step 5, extracting the ammonium sulfate brine with cyclohexanone employing at least 5 mols of cyclohexanone per mol of hydroxylamine present in the brine and introducing the cyclohexanone extract into step 2.

References Cited in the file of this patent

UNITED STATES PATENTS

| | | |
|---|---|---|
| 2,562,205 | Novotny et al. | July 31, 1951 |
| 2,822,393 | Nicolaisen et al. | Feb. 4, 1958 |

FOREIGN PATENTS

| | | |
|---|---|---|
| 677,386 | Great Britain | Aug. 13, 1952 |

OTHER REFERENCES

Ser No. 390,038, Laucht (A.P.C.), published April 20, 1943.